Sheet 1 – 2 Sheets.

M. Stannard.
Water Meter.

N° 92222.          Patented Jul. 6. 1869

Witnesses.
R. F. Blodgett
William Eadie

Inventor.
Monroe Stannard

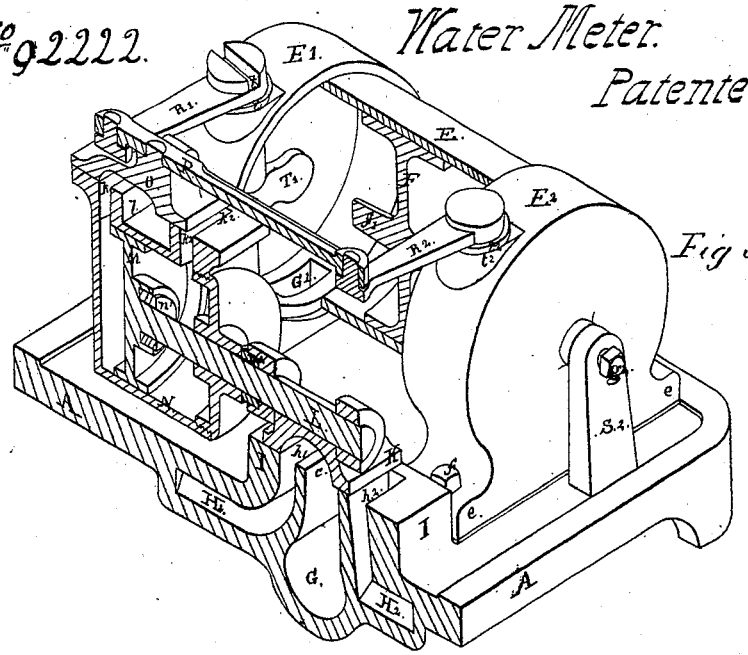
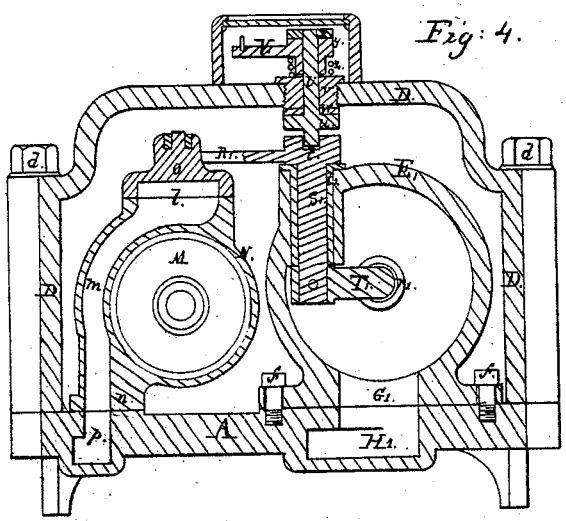
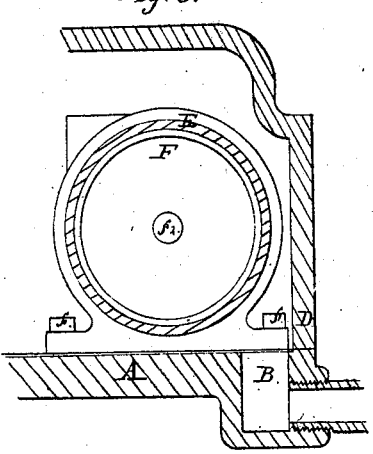
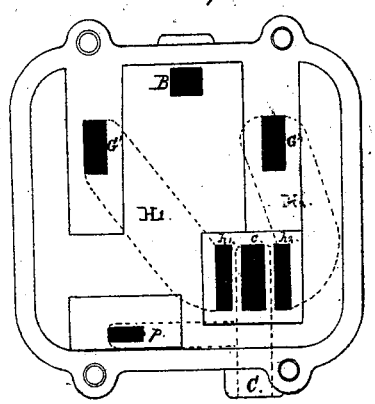
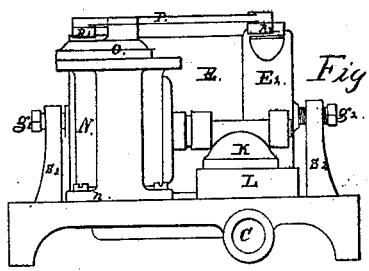

United States Patent Office.

MONROE STANNARD, OF HARTFORD, CONNECTICUT, ASSIGNOR TO PRATT, WHITNEY & CO., OF SAME PLACE.

Letters Patent No. 92,222, dated July 6, 1869.

IMPROVEMENT IN WATER-METERS.

The Schedule referred to in these Letters Patent and making part of the same.

*To all whom it may concern:*

Be it known that I, MONROE STANNARD, of Hartford, in the county of Hartford, and State of Connecticut, have invented certain new and useful Improvements in Water-Meters; and I do hereby declare the following to be a full, clear, and exact description of the same, reference being had to the accompanying drawings, and to the characters of reference marked thereon.

My improvements relate to that kind of meter for water or other liquids, in which the principal part of the measuring-apparatus consists of a cylinder, containing a piston, which is moved by the water to be measured, and sweeps each time through a known volume; the number of strokes made by the piston indicating the quantity of water delivered, which is recorded by a register.

Heretofore meters of the kind described have had objectionable features. Some kinds are of complicated construction; others fail to give accurate indications, because of a lack of definiteness in the movements of the piston or of the registering-apparatus. And in all those with which I am acquainted, the arrangement of the parts is such as to render it necessary either to disconnect the inlet or outlet-pipes, or else to take off more than one cover, in order to get easily at all the working-parts.

It is the object of my invention to remedy the defects above alluded to.

To this end my said invention consists—

First, in enclosing within a case to which the water to be measured is admitted, a principal measuring-cylinder and piston, and a secondary cylinder and piston of smaller size, which is combined with the main valve, and operates the same, as hereinafter described.

Secondly, in attaching the working-parts of the meter to a base-plate or channel-plate, in which are formed ducts or passages for the introduction into the meter from the inlet-pipe, of the water to be measured, for its distribution to the measuring-cylinder, and for its delivery to the outlet; and in combining with the said channel-plate a box-like cover which contains the working-parts, but is detachable therefrom, and may be removed without displacing them, and without disturbing the inlet or outlet-pipe.

Thirdly, in making the heads of the main measuring-cylinder cap-formed, and in leading the water to the cylinder through perforations in the wall of the said cap, so that the cylinder may be of simple form and easily fitted up.

Fourthly, in securing the cap-formed heads of the cylinder to the channel-plate by bolts, when the said heads are forced against the cylinder by set-screws, as hereinafter described, so as to effect water-tight connection of the heads with both the channel-plate and the cylinder.

Fifthly, in moving the secondary valve at each end of the main piston's stroke, by means of separate driving-levers, located, one at each end of the main cylinder, and arranged substantially as hereinafter clearly explained, thus avoiding complicated connections within the cylinder.

Sixthly, in the peculiar arrangement, hereinafter described, for making a water-tight joint at the place where the axis of the valve-driving levers enters the main cylinder-heads.

Seventhly, in so arranging the parts by which the register-pawl is moved, that the said pawl shall be caused to move the register the proper distance by that part of the movement of the secondary valve which is necessary to overcome the "lap" of the said valve, for the purpose hereinafter explained.

Eighthly, in providing for moving the register-pawl through a frictional coupling, or an equivalent therefor, and in limiting the movement of the pawl by positive stops, whereby excessive movement of the mechanism which operates the pawl, is prevented from producing too great indication by the register.

To enable others skilled in the arts to make and use my invention, I will proceed to a description thereof.

In the accompanying drawings, similar characters of reference denote the same part in the several figures.

Figure 1, sheet 1, is a longitudinal section of the meter at the axis of the main measuring-cylinder.

Figure 2 is a plan of the meter with the register-case removed.

Figure 3, sheet 2, is a sectional isometric projection of the principal working-parts of the meter, with the box-like cover removed.

Figure 4 is a cross-section at line X X, fig. 1.

Figure 5 is a partial cross-section at line Y Y.

Figure 6 is a side elevation of the meter, with the cover removed.

Figure 7 is a plan of the channel-plate or base-plate A.

Figure 1:
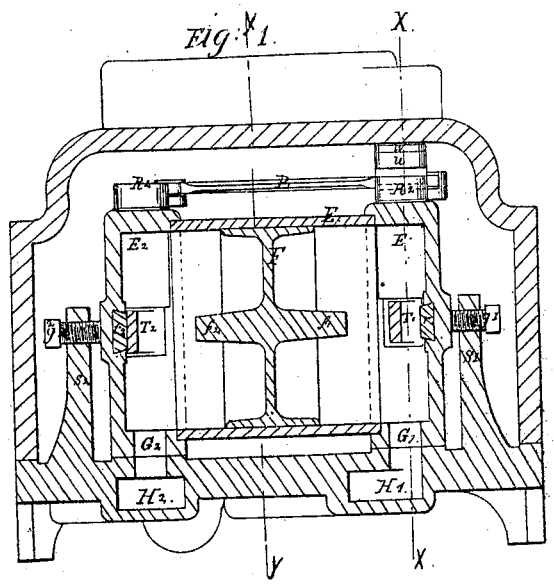
Figure 2:
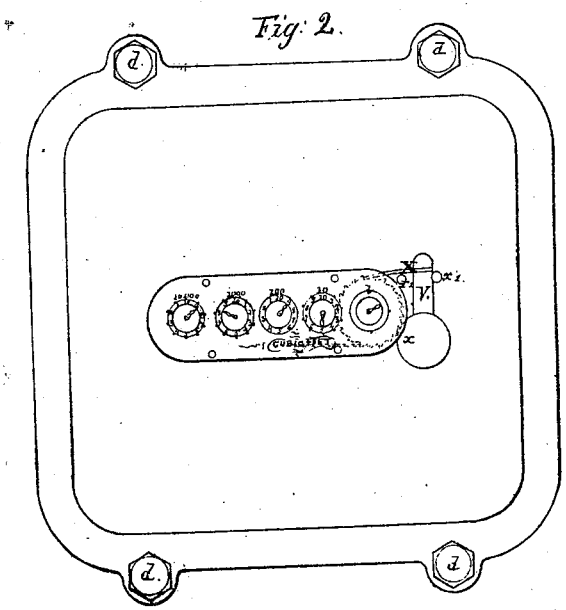

A is the channel-plate or base-plate of the meter. It supports all the working-parts, and has formed in its substance the inlet-passage B, into which the supply-pipe is screwed; also the outlet-passage C, which receives the delivery-pipe, and sundry other passages or channels hereinafter described. This plate is surmounted by a case or cover, D, in the form of a box with an open bottom, the edges of which match the outline of the plate, and form a water-tight joint with the top surface of the said plate to which the cover is secured by bolts $d$. The box D covers and contains all the working-parts, and first receives all the water to be measured, which passes into it by the inlet-duct B, (shown in figs. 5 and 7.)

E is the principal measuring-cylinder. It is formed of a straight tube of brass, the ends of which fit into recesses formed in the heads $E^3$ and $E^2$, which consist of short caps, nearly cylindrical in form, but made flat on the bottom, and furnished with ears, $e$, through which they may be fastened in a vertical position, by bolts $f$, to the channel-plate. These heads or caps are forced against the ends of the cylinder E by set-screws $g^1$ and $g^2$, which are screwed through two strong standards $h^1$ and $h^2$, cast in one piece with the channel-plate. The points of the screws bear against the centres of the caps.

A light piston, F, having centrally-projecting prongs, $f^1$ and $f^2$, slides freely in the cylinder E.

Through the bottom of the rear cylinder-head $E^1$ is an opening, $G^1$, which matches the mouth of a duct or passage, $H^1$, formed within the substance of the channel-plate, and leading diagonally to a raised valve-seat, I, where it finds an outlet through a port, $h^1$. The valve-seat I is located at one side of the cylinder E, is parallel to it, and near its front end. It contains two other ports, one of which, $h^2$, opens into a duct, $H^2$, also formed in the channel-plate A, and leading directly to the front end of the cylinder E, to which it finds an entrance through an opening, $G^2$, in the cap $E^2$, corresponding to the opening $G^1$ in $E^1$. The third port C, in the valve-seat I, is midway between $h^1$ and $h^2$, and leads into the main outlet-passage O of the meter, which passage lies directly under the port, and opens at the side of the channel-plate in the substance of which it is formed.

The valve-seat I is surmounted by a sliding cupped valve, K, made like the distribution-valve of a locomotive. This, by its movements, uncovers the two ports $h^1$ and $h^2$ alternately, and alternately covers them with its cup, thereby bringing them into communication with the outlet-port $c$.

The valve K is attached to the end of the rod L of a piston, M, which slides in a small closed cylinder, N, which I call the secondary cylinder. This is surmounted by a flat surface upon which slides a cupped valve, O, which by its movements uncovers alternately the ports $k^1$ and $k^2$, which open into opposite ends of the cylinder N, and alternately bring them into communication with an exhaust-port, $l$, located midway between them. The port $l$ opens into a duct, $m$, which passes down around the cylinder through the foot $n$, by which the cylinder is supported, and into a duct or channel, $p$, formed in the channel-plate A, and leading directly into the main outlet O.

The valve O is formed with considerable outside lap; that is to say, its length is so much greater than the distance between the outside edges of the ports $k^1$ and $k^2$, that its movement, after closing one of the said ports, must be considerable before the other port will be at all uncovered.

To the top of the valve O is attached a bar, P, which extends rearward and forward of the valve. The rear end of this bar is jointed to the free end of the horizontal arm $R^1$ of a lever, the fulcrum of which is a vertical rock-shaft, $S^1$, made in one piece with the arm $R^1$. The rock-shaft is supported by and enters the rear cap $E^1$ of the main measuring-cylinder. It turns in a brass bushing $t^1$, which penetrates the wall of the cap near one side. The hub of the arm $R^1$ fits nicely the top-end surface of the bushing $t^1$, forming a water-tight joint therewith; that is to say, the lower surface of the hub projecting around the rock-shaft, forms a valve which is seated upon the top of the bushing. The lower end of the rock-shaft $S^1$ lies within the cap $E^1$, and to this lower end is firmly fastened the other horizontal arm $T^1$ of the valve-driving lever. This arm $T^1$ is considerably shorter than the long arm $R^1$, and its free end lies within the cap just in the axis of the cylinder E.

The forward end of the bar P is jointed to the longer arm $R^2$ of a lever, the rock-shaft $S^2$ of which, and the shorter arm $T^2$, are arranged relatively to the front cap $E^2$, in precisely the same way as are $R^1$, $S^1$, and $T^1$ relatively to the rear cap $E^1$, $t^2$ being the bushing through which $S^2$ passes.

The hub of the arm $R^1$ has in its top a slot, $t$, like the nick of a screw, into which engages a tongue, formed on the bottom of the flange $u$ of a small spindle, U, which passes up through, and is free to turn in a brass bushing, $v$, screwed through the top of the box-like cover D of the meter.

A washer, $w$, of leather, or other suitable material, surrounds the spindle U, between its flange and the lower end of the bushing $v$. It serves as a packing, to prevent leakage of water around the spindle.

A collar, $x$, is pinned fast to the upper end of the spindle U.

Under this collar is a leathern washer, $y$, beneath which is an arm or lever, V, the hub of which surrounds the spindle, and is free to turn on it, being only attached thereto by being forced up against the washer $y$ by a spiral spring, $z$, which lies under the lever, and bears against the top of the bushing $v$.

The end of the lever V is furnished with a pawl, X, which engages with the teeth of a ratchet-wheel, fastened to the arbor of the first wheel of a train of wheel-work, which constitutes the register of the meter, and is like the register of a gas-meter.

The movement of the arm or lever V is limited by two pins, $x^1$ and $x^2$, whose distance apart is such that each movement of the lever may be sufficient to cause the pawl to move the ratchet-wheel a certain number of teeth, but not enough to move it one tooth more than the given number.

The collar $x$, washer $y$, and spiral spring $z$, form a frictional coupling, by which the lever V is connected with the spindle U, and is moved by it, but which enables the spindle to turn in either direction further than it moves the lever V, which is stopped by the pins $x^1$ and $x^2$.

Small cushions, $r^1$ $r^2$, of India rubber or leather, are inserted centrally in the inside of the caps $E^1$ and $E^2$, and serve as noiseless stops, against which the short lever-arms strike, and limit the stroke of the piston F.

India-rubber rings, $n^1$ and $n^2$, are also inserted in the hub of the piston M, and in a collar on the rod L. By these the stroke of the secondary piston is limited.

The operation of the apparatus above described is as follows:

Water from the source of supply fills the box-like cover D of the meter, through the inlet B, and if all the parts are in the positions shown in the drawings, the water enters the port $h^2$, flows through the passage $H^2$ and the opening $G^2$, into the front end of the measuring-cylinder.

This forces the piston F towards the rear, and empties a certain quantity of water out of the rear end of the cylinder E, through the opening $G^1$, passage $H^1$, port $h^1$, and the cup of the valve K, and discharges it through the outlet or delivery-passage O.

When the piston F has gone so far that its prong $f^1$ comes in contact with the short lever-arm $T^1$, the end of the said arm is forced back, and consequently the longer arm $R^1$, the secondary valve O, and the long lever-arm $R^2$, are all pressed forward.

The spindle U is turned by the movement of the arm $R^1$, and this moves the pawl-arm V, which actuates the register.

The forward movement of the valve O uncovers the port $k^1$, leading to the rear end of the secondary cylinder, and the water, flowing in from the box D, presses forward the piston M, forcing out the water which is in front of it, through the port $k^2$, the cup of the valve O, the port $l$, the passages $m$ and $p$, and, finally, through the main outlet or delivery-passage O.

By this movement of the piston M, the main valve K is carried forward, so as to cover the port $h^2$ with its cup.

It also uncovers the port $h^1$, which admits water from the box D to the rear end of the cylinder E, and this forces forward the piston F, and causes the discharge of the water from the front end of the cylinder E out at the delivery C.

When the front prong $f^2$ touches the end of the short lever-arm $T^2$, this is pressed forward, and the position of the secondary valve O is thereby reversed, and brought back into the position shown in the drawings.

This admits water to the front end of the secondary cylinder, and causes the rearward stroke of the piston M, and the discharge, through the outlet C, of the water in the rear end of the small cylinder.

By this movement of the piston M, the main valve K is drawn back, and all the parts are again brought into the position shown in the drawings, causing a repetition of the described movements, so long as water is supplied to the meter and drawn from the delivery.

The size of the secondary cylinder N is such that it shall give only sufficient power to move the valve K with certainty, and it is important to reduce its area as much as is consistent with this requirement, as it is found that by so doing, greater definiteness in the length of stroke of the piston F is obtained under varying speeds.

The lap of the valve O is so great, that as much angular movement of the lever-arm $R^1$ is required to overcome the said lap, as is needed to give to the register-pawl arm V the amount of motion necessary to effect a record.

By this provision, no reversal of the movement of the main piston F can be made to take place without a corresponding and sufficient movement of the spindle U, which drives the register-pawl arm V.

The additional movement of the lever-arm $R^1$, necessary to uncover the port $k^1$ or $k^2$, after the lap of the valve is overcome, is permitted without effect on the register, by the frictional coupling by which the pawl-arm V is moved, and by the stops $x^1$ and $x^2$, which limit its movements.

The register is made to indicate the whole quantity of water which passes through both cylinders E and N.

The pressure of the water in the box D is, when the meter is acting, greater than in the cylinder E. This forces the hubs of the lever-arms $R^1$ and $R^2$ upon their bushings, and prevents leakage of water into the cylinder around the rock-shafts $S^1$ and $S^2$.

By this self-packing arrangement of the rock-shaft, by which the movement of the piston F is transmitted to the valve O, the use of a stuffing-box for the shaft is avoided.

This feature of my invention is applicable to some kinds of duplex-cylinder meters.

Having described my invention, I wish it to be understood that I do not claim the use of two measuring-cylinders in the same case or box, when these are of nearly equal size, and constitute a duplex measuring-apparatus; nor do I claim as new the arrangement of the working-parts within a single case, when this is not combined with a channel-plate, separate from a box like cover, as described.

What I claim as my invention, and desire to secure by Letters Patent of the United States, is—

1. The combination, with the principal measuring-cylinder E, of a smaller secondary cylinder M and piston N, the latter connected to and operating the main valve K of the principal cylinder, when both cylinders are arranged within a case, to which the water to be measured is admitted, substantially as and for the purpose set forth.

2. Also, the combination of the channel-plate A, for supporting the working-parts of the meter, and containing the inlet and outlet-passages B and C, and the channels of communication $H^1$ and $H^2$, with the measuring-cylinder and with the box-like cover D, when this is arranged substantially as described, to facilitate uncovering the working-parts.

3. Also, the caps $E^1$ and $E^2$, with their openings $G^1$ and $G^2$, in combination with the tubular part E of the main measuring-cylinder.

4. Also, the combination of the bolts $f$ and $f$ and the set-screws $g^1$ and $g^2$ with the caps $E^1$ and $E^2$, and the tubular part E of the main cylinder, as described, for the purpose specified.

5. Also, the combination of the two lever-arms T and $T^2$, lying within the measuring-cylinder or its caps, one at each end of the cylinder, with the two lever-arms $R^1$ and $R^2$, lying outside of the cylinder, and connected with the valve O, for the purpose hereinbefore set forth.

6. Also, the combination of the bushings $t^1$ with the self-packing hubs, upon the top of the valve-driving rock-shafts $S^1$ $S^2$, substantially as set forth.

7. Also, the combination of the registering-pawl with the secondary valve O, substantially as described, so that the required movement of the pawl shall be produced by that portion of the movement of the valve necessary to overcome the "lap" of the valve, for the purpose hereinbefore set forth.

8. Also, the combination, with the register-pawl arm V and the mechanism by which it is moved, of a frictional coupling, and of positive stops $x^1$ and $x^2$, for the purpose hereinbefore explained.

In testimony whereof, I have hereunto set my hand, this 16th day of February, 1869, in presence of—

MONROE STANNARD.

Witnesses:
 R. F. BLODGETT,
 H. C. ROBINSON.